US012259072B2

(12) United States Patent
Mairegger

(10) Patent No.: US 12,259,072 B2
(45) Date of Patent: Mar. 25, 2025

(54) RETAINER FOR HOLDING A LINE, FASTENING ARRANGEMENT FOR FASTENING A LINE TO A MOTOR VEHICLE AND METHOD FOR FASTENING A LINE TO A MOTOR VEHICLE

(71) Applicant: Bayerische Motoren Werke Aktiengesellschaft, Munich (DE)

(72) Inventor: Gebhard Mairegger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/276,684

(22) PCT Filed: May 17, 2022

(86) PCT No.: PCT/EP2022/063293
§ 371 (c)(1),
(2) Date: Aug. 10, 2023

(87) PCT Pub. No.: WO2022/243295
PCT Pub. Date: Nov. 24, 2022

(65) Prior Publication Data
US 2024/0110642 A1 Apr. 4, 2024

(30) Foreign Application Priority Data
May 18, 2021 (DE) .................. 10 2021 112 778.5

(51) Int. Cl.
*F16L 3/00* (2006.01)
*F16L 3/10* (2006.01)

(52) U.S. Cl.
CPC ................... *F16L 3/1075* (2013.01)

(58) Field of Classification Search
None
See application file for complete search history.

(56) References Cited

U.S. PATENT DOCUMENTS 6,079,673 A    6/2000  Cox
7,162,790 B1   1/2007  Daniels
(Continued)

FOREIGN PATENT DOCUMENTS

DE    10 2005 053 391 A1    5/2007
DE    10 2014 221 104 A1    4/2016
(Continued)

OTHER PUBLICATIONS

International Search Report (PCT/ISA/210) issued in PCT Application No. PCT/EP2022/063293 dated Oct. 19, 2022 with English translation (4 pages).
(Continued)

*Primary Examiner* — Steven M Marsh
(74) *Attorney, Agent, or Firm* — Crowell & Moring LLP

(57) ABSTRACT

A retention member for holding a line includes first and second retention elements connected to one another such that the retention member is pivotable between a retaining position, in which the first and second retention elements abut one another, and a fitting position, in which the first and second retention elements are spaced apart. The first and second retention elements each have a line guide, and in the retaining position the line guides together form a through-opening for the line. The first retention element has an insertion element which can be disposed in a receptacle of a fastening arrangement, which receptacle is fixed to the vehicle, and the insertion element comprises a first through-hole. The second retention element has a second through-hole which is aligned with the first through-hole in the retaining position. The receptacle fixed to the vehicle comprises a recess. If the retention member is disposed in the recess fixed to the vehicle, the first through-hole, the second through-hole and the recess are aligned and a securing element is disposed therein, securing the retention member (Continued)

in the retaining position and on the receptacle fixed to the vehicle.

15 Claims, 3 Drawing Sheets

(56) References Cited

U.S. PATENT DOCUMENTS

| | | | |
|---|---|---|---|
| 8,979,039 | B2 | 3/2015 | Shiga |
| 11,268,634 | B1* | 3/2022 | Lara Sandoval ....... F16L 3/137 |
| 2007/0066101 | A1* | 3/2007 | Suzuki ................ B60R 16/0215 |
| | | | 439/99 |
| 2013/0009019 | A1 | 1/2013 | Fukumoto |
| 2014/0091182 | A1 | 4/2014 | Fukumoto |
| 2016/0114743 | A1* | 4/2016 | Miyamoto ............... H02G 3/32 |
| | | | 224/557 |
| 2017/0297516 | A1 | 10/2017 | Loebe |
| 2021/0246999 | A1* | 8/2021 | Honda ................ B60R 16/0215 |
| 2021/0293356 | A1* | 9/2021 | Ayala .................... F16M 11/242 |
| 2021/0324973 | A1* | 10/2021 | Kranz ................ G02B 6/44715 |
| 2023/0120271 | A1* | 4/2023 | Saito .................... H01B 7/0045 |
| | | | 174/72 A |

FOREIGN PATENT DOCUMENTS

| | | |
|---|---|---|
| DE | 10 2019 116 624 A1 | 1/2021 |
| EP | 0 653 803 A1 | 5/1995 |
| EP | 3 203 129 A1 | 8/2017 |
| EP | 3 296 604 A1 | 3/2018 |

OTHER PUBLICATIONS

German-language Written Opinion (PCT/ISA/237) issued in PCT Application No. PCT/EP2022/063293 dated Oct. 19, 2022 with English translation (10 pages).

German-language Search Report issued in German Application No. 10 2021 112 778.5 dated Apr. 12, 2022 with partial English translation (12 pages).

* cited by examiner

RETAINER FOR HOLDING A LINE, FASTENING ARRANGEMENT FOR FASTENING A LINE TO A MOTOR VEHICLE AND METHOD FOR FASTENING A LINE TO A MOTOR VEHICLE

BACKGROUND AND SUMMARY

The present invention relates to a retention member for receiving a line and a fastening arrangement for fastening a line to a motor vehicle, the fastening arrangement comprising such a retention member. Furthermore, the present invention relates to a method for fastening a line to a motor vehicle by means of such a fastening arrangement.

In order to ensure a defined position or a defined path of lines within a motor vehicle and to provide a pull compensation for the lines, lines in motor vehicles are generally fastened so as to be secured to the vehicle.

From the prior art, different arrangements for fastening a line to a motor vehicle are known.

EP 3 296 604 A1 describes a fastening arrangement for fastening a line to a motor vehicle, comprising a retention member and a connection element. The retention member has an upper retention element and a lower retention element. The upper retention element and the lower retention element are connected to each other so as to be able to be pivoted relative to each other. On the upper retention element, an engagement portion is arranged with an engagement hook which secures the upper retention element in a retention position. In the retention position, the upper retention element and the lower retention element surround the line. Via another engagement hook, the retention member is fixed to the connection element. The connection element is secured to the motor vehicle by means of a screw.

In order to fasten a line to a motor vehicle, therefore, the fastening arrangement known from EP 3 296 604 A1 requires three securing elements, that is to say, the first engagement hook, the additional engagement hook and the screw. A fastening of a line by means of this fastening arrangement consequently requires a large number of manual assembly operations and is therefore time-intensive and cost-intensive.

An alternative arrangement for fastening a line to a motor vehicle is known from DE 10 2019 116 624 A1. DE 10 2019 116 624 A1 describes a guiding arrangement for a motor vehicle comprising a carrier element in the form of a component which is secured to the body and a connection element. The carrier element comprises a through-opening for a line. By means of the connection element, the line which is arranged in the through-opening is fastened to the carrier element.

In the guiding arrangement known from DE 10 2019 116 624 A1, the through-opening is thus formed in the carrier element itself which is a constituent of a component which is secured to the body. In order to fasten a line to the guiding arrangement, therefore, the line is intended to be guided from one side through the through-opening. If the diameter of the line is selected to be similar to the diameter of the through-opening, guiding the line through the through-opening is difficult and time-intensive. If the diameter of the line is in contrast significantly smaller than the diameter of the through-opening, the line can be moved freely back and forth in the through-opening so that a defined positioning of the line within the motor vehicle and a pull compensation for the line is not ensured.

Therefore, the fastening of a line by means of the guiding arrangement known from DE 10 2019 116 624 A1 at a defined position within the motor vehicle is difficult and time-intensive.

Based on EP 3 296 604 A1, an object of the present invention is to provide a retention member for receiving a line, by means of which the line can be fastened in a precise position in a simple manner, and a fastening arrangement for fastening a line to a motor vehicle which comprises such a retention member and which enables an easy-to-assemble fastening of the line to the motor vehicle. Furthermore, an object of the present invention is to provide a method which enables a simple and rapid fastening of a line to a motor vehicle.

This object is achieved by a retention member, a fastening arrangement, and by a method, in accordance with the independent claims.

According to the invention, there is provided a retention member for receiving a line, which retention member comprises a first retention element and a second retention element. The first retention element and the second retention element are pivotably connected to each other by a joint in such a manner that the retention member can be moved or pivoted between a retention position, in which the first retention element and the second retention element are at least partially in abutment with each other, and an assembly position. In the assembly position of the retention member, the first retention element is spaced apart from the second retention element. In the assembly position, the first retention element and the second retention element are thus connected to each other or in contact with each other only indirectly, by way of the joint. The first retention element and the second retention element each comprise a line guide. The line guides together define, in the retention position of the retention member, a through-opening for the line. The first retention element has an insertion element. The insertion element is constructed in such a manner that it can be arranged in a receiving member which is secured to the vehicle, in particular secured to the motor. In particular, the insertion element corresponds to a receiving member which is secured to the vehicle. The first retention element and the second retention element comprise a first through-hole and a second through-hole, respectively. If the retention member is in the retention position, the first through-hole and the second through-hole are in alignment with each other. Consequently, a fastening element for fastening the retention member in the retention position and to the receiving member which is secured to the vehicle can be arranged in the first through-hole and the second through-hole.

The core notion of the present invention is thus to configure the retention member in such a manner that the retention member can be pivoted in a simple manner, that is to say, by pivoting the first and/or the second retention element about a pivot axis defined by the joint between an assembly position, in which a line can be arranged or introduced in the line guide of one of the retention elements, and a retention position, in which the line is arranged and secured or fixed in the through-opening defined by the line guides.

In addition, the retention member according to the invention, as a result of the fact that the first retention element and the second retention element are constructed with a first through-hole or a second through-hole which are in alignment with each other in the retention position, are secured by means of a single securing element in the retention position and are fixed to a vehicle.

The retention member according to the invention can thus be assembled on a vehicle in a simple manner, resulting in short assembly times and low assembly costs.

In an advantageous embodiment, the retention member is constructed according to the invention in one piece or in an integral manner. This further reduces assembly complexity.

The joint which connects the first retention element and the second retention element to each other may be a hinge. The hinge may define a rotation axis, about which the first retention element and the second retention element can be rotated or pivoted relative to each other. In particular, the joint may be a film hinge which as a result of its bendability enables a rotational movement of the first retention element and the second retention element relative to each other.

The retention member is, for example, a plastics material injection-molded component. This enables simple production of the retention member.

With a preferred embodiment of the retention member according to the invention, the first retention element comprises a pin. The second retention element comprises a recess which corresponds to the pin. In the retention position of the retention member, the pin is arranged in the recess.

The second retention element may also comprise a pin and the first retention element may also comprise a recess which corresponds to the pin.

For example, the retention member can be (pre-)secured or (pre-)assembled in the retention position by means of the pin and the recess or a wall which defines the recess.

The securing of the pin in the recess may be based on a non-positive-locking and/or a positive-locking connection between the pin and the wall which defines the recess. As a result of the (pre-)securing of the retention member by means of the pin and the recess in the retention position, during assembly of the retention member on a motor vehicle a fastening element can be introduced in a simple manner into the first through-hole and the second through-hole of the retention member. The (pre-)securing of the retention member in the retention position thus further simplifies the assembly of the retention member on a motor vehicle.

In an exemplary embodiment of the retention member according to the invention, the line guides each have a semi-circular profile. The diameter of the semi-circular profile can be configured according to the diameter of the line which is intended to be secured. In particular, the diameter of the semi-circular profile of the line guides may correspond to the diameter of the line which is intended to be secured. Consequently, there is a positive-locking connection in the retention position of the retention member between the line guides which define the through-opening for the line and the line. The positive-locking connection prevents the line from moving within the through-opening. Consequently, the line can be fixed to the vehicle in a precise position.

Furthermore, there is proposed a fastening arrangement for fastening a line to a motor vehicle which comprises a receiving member which is secured to the vehicle, in particular secured to the motor, a securing element or a fastening means and a retention member described above. In a mounted position of the fastening arrangement, the insertion element of the retention member is arranged in the receiving member which is secured to the vehicle and the retention member is located in the retention position. In the assembled position, the insertion element is arranged in the receiving member which is secured to the vehicle in such a manner that a recess of the receiving member which is secured to the vehicle is in alignment with the first through-hole and the second through-hole of the retention member. The securing element is arranged in the first through-hole of the retention member, the second through-hole of the retention member and the recess of the receiving member which is secured to the vehicle in such a manner that it secures or fixes the retention member in the retention position and to the receiving member which is secured to the vehicle.

By means of the fastening arrangement according to the invention, it is thus possible with only one securing element to secure the retention member in the retention position and the retention member to the receiving member which is secured to the vehicle. The time required for the assembly of the fastening arrangement and consequently also the assembly costs are consequently low.

In a preferred embodiment of the fastening arrangement according to the invention, the securing element is a screw or a clip. The securing element can thus be releasably fixed in the first through-hole of the retention member, the second through-hole of the retention member and the recess of the receiving member which is secured to the vehicle.

The recess of the receiving member which is secured to the vehicle may be delimited by a boundary or a wall at an upper end which in the retention position of the retention member faces the through-opening of the retention member or which faces an opening of the receiving member which is secured to the vehicle and through which the retention member can be introduced into the receiving member which is secured to the vehicle. If the securing element is arranged in the first through-hole and the second through-hole of the retention element and the recess of the receiving member which is secured to the vehicle, the boundary thus prevents the retention member from being able to be removed or taken out of the receiving member which is secured to the vehicle.

The recess of the receiving member which is secured to the vehicle is, for example, constructed in a U-shaped manner. The recess is, for example, constructed to be open at the lower end thereof facing away from the upper end.

Alternatively, the recess may be constructed to be round.

In a preferred embodiment of the fastening arrangement according to the invention, the retention member can be arranged or introduced only or simply in a specific (relative) position or orientation in the receiving member which is secured to the vehicle. It is thereby ensured that the retention member during assembly is mounted correctly in the receiving member which is secured to the vehicle, that is to say, in a defined arrangement or position relative to the receiving member which is secured to the vehicle.

To this end, the receiving member which is secured to the vehicle may comprise positioning elements, such as projections and/or recesses. The insertion element comprises positioning counter-elements which correspond to the positioning elements.

The receiving member which is secured to the vehicle may also be configured in such a geometric manner that the retention member can be introduced into the receiving member which is secured to the vehicle only in one specific position. The completed fixed receiving member may thus, for example, comprise chamfers and/or have a tapering cross section.

Furthermore, a method for fastening a line to a motor vehicle by means of the fastening arrangement described above is proposed. The method involves introducing the insertion element of the retention member into the receiving member which is secured to the vehicle, arranging the line in the line guide of the first retention element and introducing a securing element into the second through-hole of the second retention element, the recess of the receiving member which is secured to the vehicle and the first through-hole of the first retention element in such a manner that the securing element secures or fixes the retention element in the retention position and to the receiving member which is secured to the vehicle.

As a result of the method according to the invention, it is thus possible in a simple manner to fasten a line to a motor vehicle. In order to secure the line to the motor vehicle, only one single securing element is required in this instance. This securing element secures both the retention member in the retention position and the retention member to the receiving member which is secured to the vehicle. Consequently, the complexity required for the assembly of the fastening arrangement is low.

In a preferred embodiment of the method according to the invention, the securing element is screwed into the second through-hole of the second retention element, the recess of the receiving member which is secured to the vehicle and the first through-hole of the first retention element. Alternatively, the securing element can be clip-fitted in the second through-hole of the second retention element, the recess of the receiving member which is secured to the vehicle and the first through-hole of the first retention element.

The invention is explained in greater detail below with reference to an embodiment which is illustrated in the drawings.

DETAILED DESCRIPTION OF THE DRAWINGS

Figure 3:
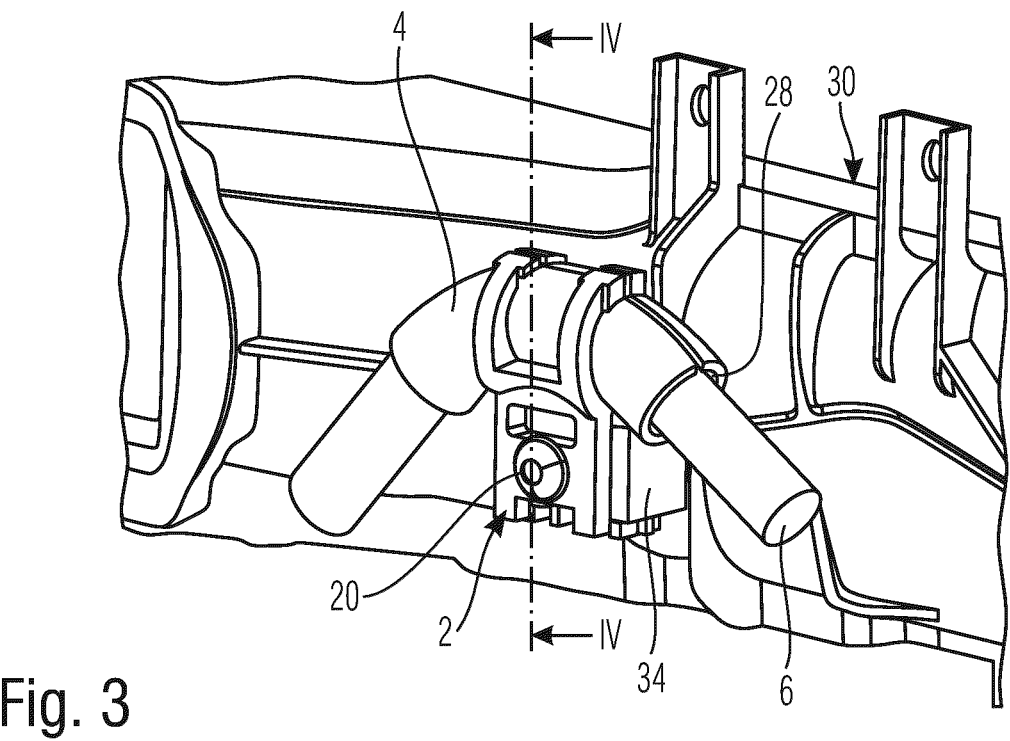
FIG. 3 is a perspective view of a fastening arrangement in an assembled position, comprising the retention member illustrated in FIG. 1.
Figure 4:
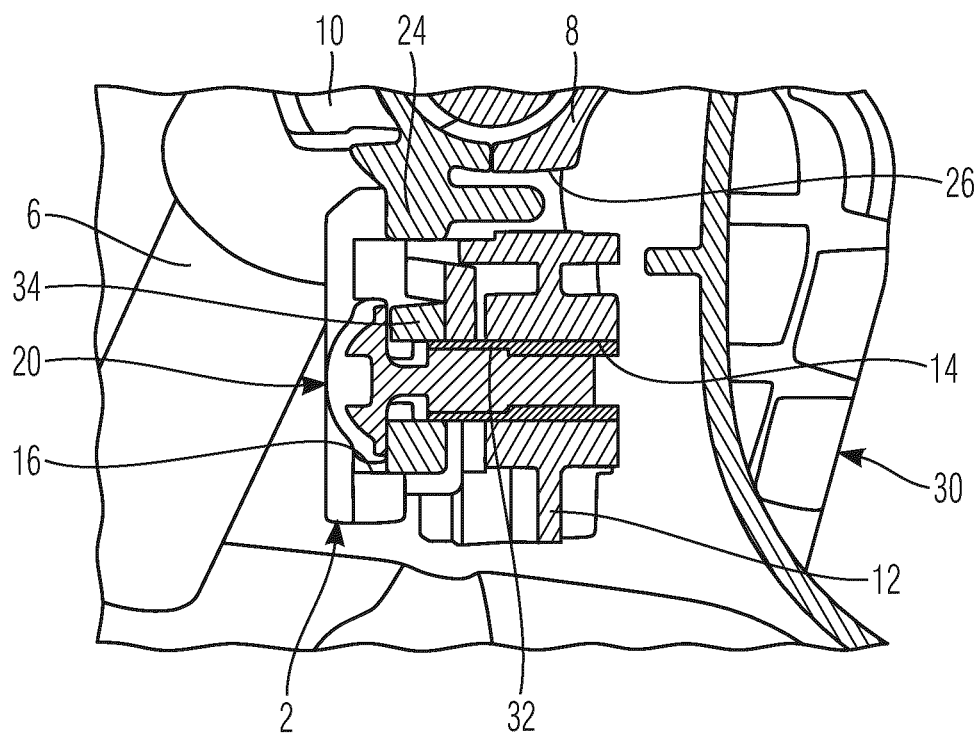
FIG. 4 is a part-region of a sectioned view through the fastening arrangement along line IV-IV in FIG. 3.
Figure 6:
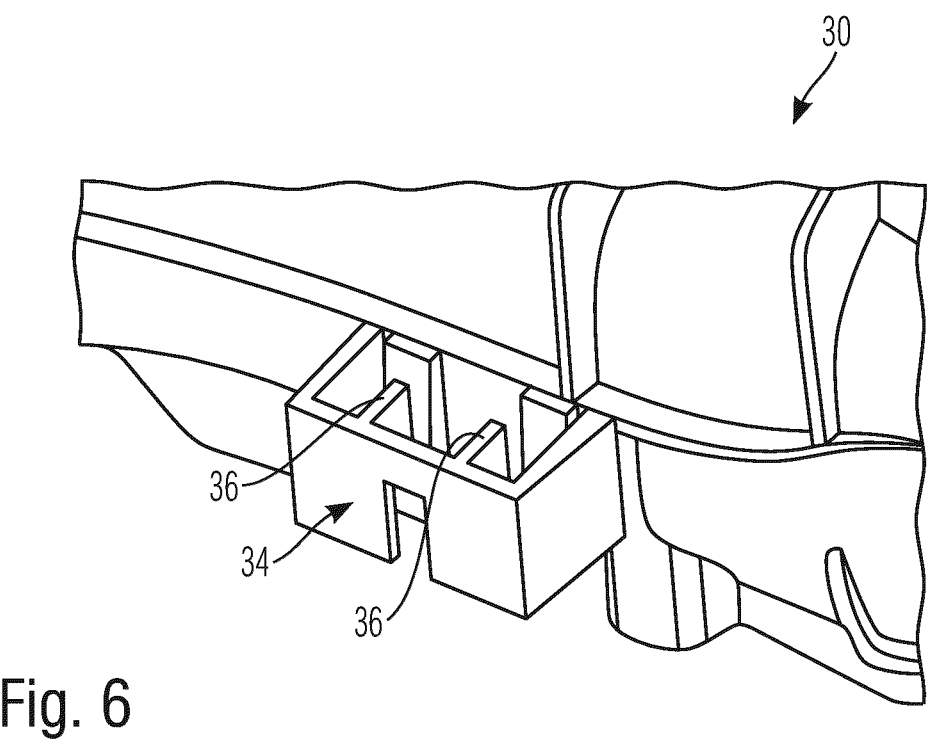
FIG. 6 is a perspective view of the suction installation having a receiving member which is secured to the vehicle from FIG. 1 viewed in isolation.

FIG. 3 and FIG. 4 show a fastening arrangement 2 which is arranged on a suction installation 30 for a motor of a motor vehicle. By means of the fastening arrangement 2, a line 6 or a cable is secured to the suction installation 30. The fastening arrangement 2 comprises a retention member 4, a securing element 20 and a receiving member 34 which is secured to the vehicle. The receiving member 34 which is secured to the vehicle is constructed integrally with the suction installation 30 (see FIG. 6).

Figure 5:
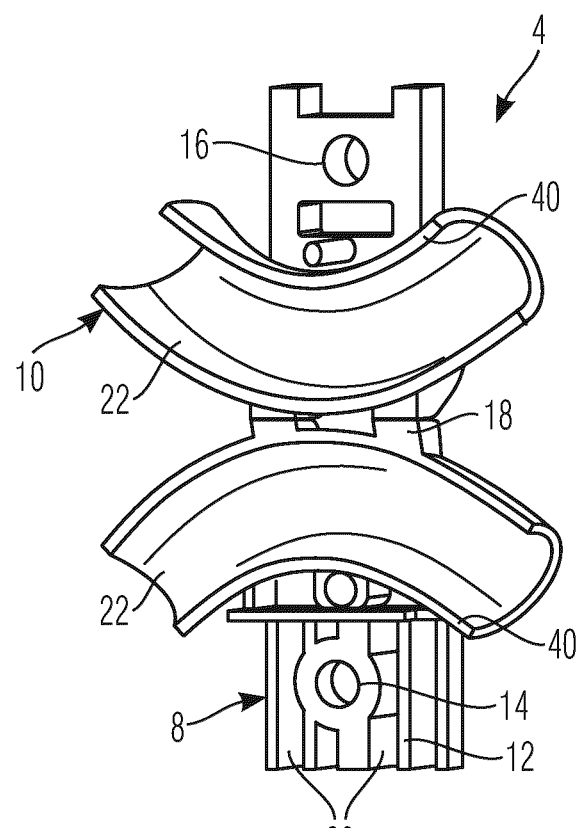
FIG. 5 is a perspective view of the retention member from FIG. 1, viewed in isolation.

As can be seen in particular from the isolated illustration of the retention member 4 as illustrated in FIG. 5, the retention member 4 is a plastics material injection-molded component which is constructed in an integral manner and which comprises a first retention element 8 and a second retention element 10.

The first retention element 8 and the second retention element 10 are pivotably connected to each other by means of a (film) hinge 18. The first retention element 8 and the second retention element 10 can consequently be pivoted relative to each other between a retention position and an assembly position about a pivot axis which is defined by the (film) hinge 18. Whilst in the retention position an inner side 40 of the first retention element 8 abuts an inner side 40 of the second retention element 10, the first retention element 8 and the second retention element 10 are connected to or in contact with each other only via the hinge 18 in the assembly position.

On the inner side 40 of the first retention element 8 and on the inner side 40 of the second retention element 10 there is formed in each case a line guide 22 which has a semi-circular profile. The diameter of the semi-circular profile corresponds or is selected to correspond to the diameter of the line 6. The line guides 22 of the first retention element 8 and the second retention element 10 define in the retention position a through-opening 28 for the line 6.

If the retention member 4 is in the assembly position, the first retention element 8 and the second retention element 10 are thus in contact with each other only via the hinge 18 and the inner faces of the first retention element 8 and the second retention element 10 are spaced apart from each other. Consequently, the line 6 can be arranged or introduced in the line guide 22 of the first retention element 8 or the second retention element 10. By subsequently pivoting the second retention element 10 in the direction of the first retention element 8 until reaching the retention position, in which the inner face 40 of the first retention element 8 and the inner face 40 of the second retention element 10 abut each other, the line is secured in the through-opening 28.

On the inner side 40, the second retention element 10 comprises a pin 24. The first retention element 8 comprises on the inner side 40 a recess 26 which corresponds to the pin 24. In the retention position of the retention member 4, the pin 24 is arranged in the recess 26 in such a manner that between the pin 24 and a wall which defines the recess 26 there is a non-positive-locking connection. The retention member 4 is consequently (pre-)secured or (pre-)assembled in the retention position.

It is also contemplated for a pin to be formed on the first retention element 8 and for the second retention element 10 to have a corresponding recess.

The first retention element 8 of the retention member 4 comprises an insertion element 12 which corresponds to the receiving member 34 which is secured to the vehicle. The insertion element 12 can be introduced through an opening of the receiving member 34 which is secured to the vehicle into the receiving member 34 which is secured to the vehicle, or arranged therein.

In order to ensure that the insertion element 12 is positioned or arranged correctly or in accordance with provisions in the receiving member 34 which is secured to the vehicle, the receiving member 34 which is secured to the vehicle comprises positioning elements 36. The positioning elements 36 are walls or projections which protrude inward in the receiving member 34 which is secured to the vehicle. The insertion element 12 of the retention member 4 comprises positioning counter-elements 38 which correspond to the positioning elements 36 of the receiving member 34 which is secured to the vehicle. The positioning counter-elements 38 are in the form of grooves or a notch.

The first retention element 8 comprises a first through-hole 14. The second retention element 10 comprises a second through-hole 16 which is formed on the insertion element 12. In the retention position of the retention member 4, the first through-hole 14 is in alignment with the second through-hole 16.

The receiving member 34 which is secured to the vehicle comprises a recess 32 on a side wall facing away from the suction installation 30. The recess 32 is constructed in a U-shaped manner and opens in a downward direction, that is to say, toward a side, facing away from the opening for introducing the retention member 4 into the receiving member 34 which is secured to the vehicle, of the receiving member 34 which is secured to the vehicle.

When the insertion element 12 of the retention member 4 is arranged in the receiving member 34 which is secured to the vehicle, the first through-hole 14 is in alignment with the recess 32. If the retention member 4 is additionally located in the retention position, the second through-hole 16 is also in alignment with the first through-hole 14 and the recess 32. Consequently, the securing element 20 can be introduced through the second through-hole 16 and through the recess 32 into the first through-hole 14 (see FIG. 4). The securing element 20 which is arranged in the second through-hole 16, the recess 32 and the first through-hole 14 then secures the retention member 14 both in the retention position and to the receiving member 34 which is secured to the vehicle.

The method according to the invention for fastening a line to a motor vehicle is illustrated with reference to FIG. 1, FIG. 2 and FIG. 3.

Figure 1:
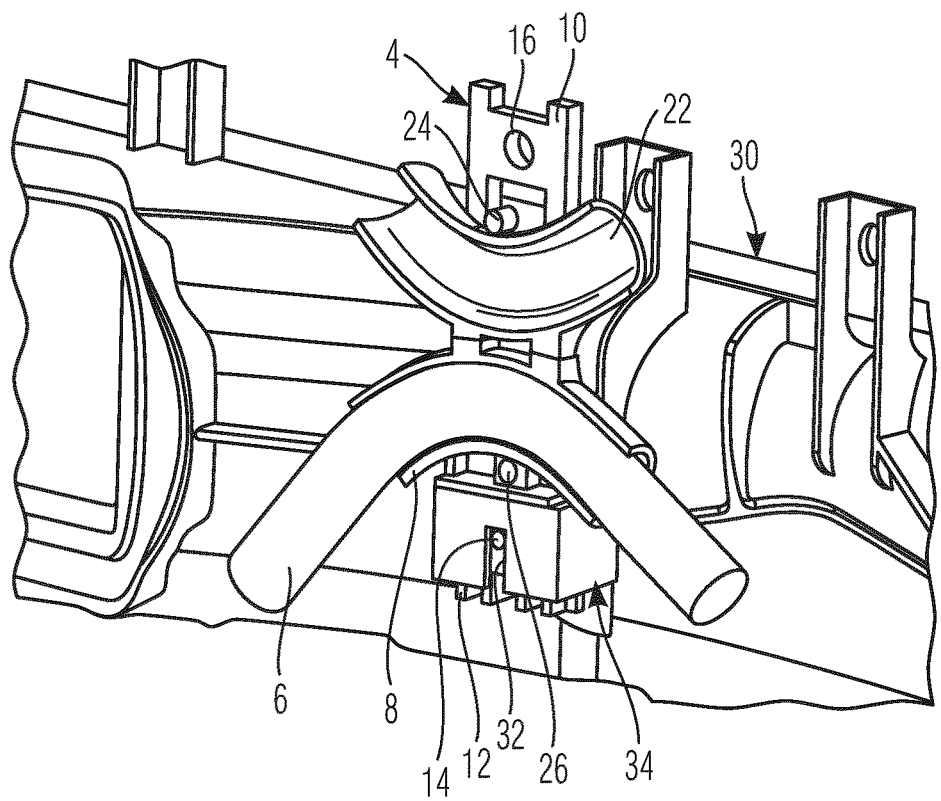
FIG. 1 is a perspective view of a retention member which is arranged on a suction installation in an assembly position.
Figure 2:
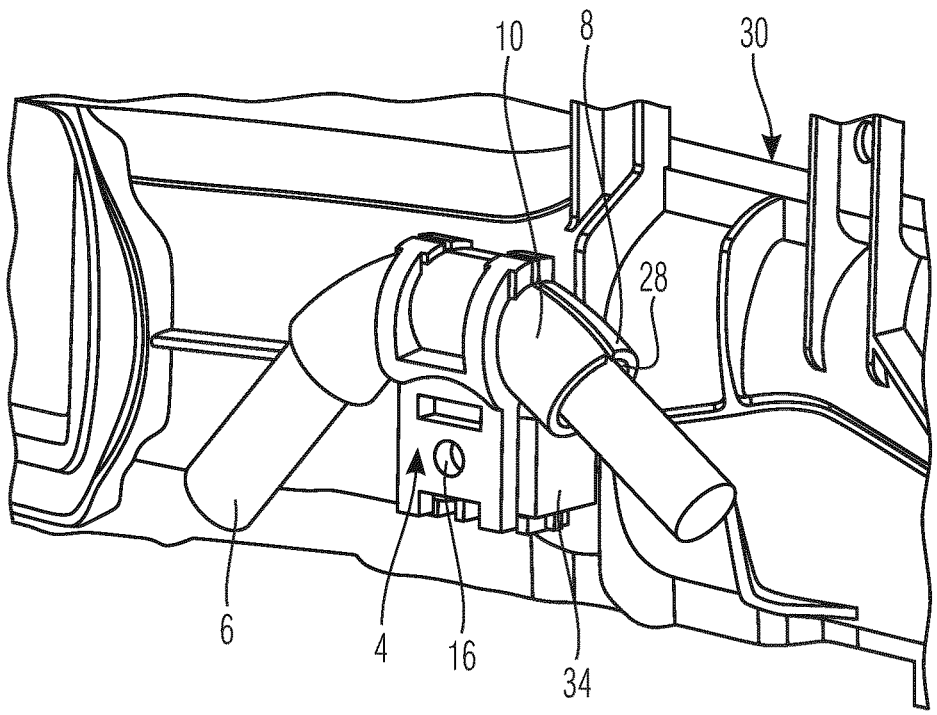
FIG. 2 is a perspective view corresponding to FIG. 1, wherein the retention member is in a retention position.

As illustrated in FIG. 1, the insertion element 12 of the retention member 4 is first introduced into the receiving member 34 which is secured to the vehicle through the opening of the receiving member which is secured to the vehicle or arranged therein in such a manner that the first through-hole 14 of the first retention element 8 and the recess 32 of the receiving member 34 which is secured to the vehicle are in alignment with each other. Subsequently, the line 6 is arranged in the line guide 22 of the first retention element 8. By pivoting the second retention element 10 about the pivot axis defined by the hinge 18, the retention member 4 is moved from the assembly position into the retention position so that the line 6 is secured or fastened to the retention member 4. After pivoting the retention member 4 into the retention position, the second through-hole 16 of the second retention element 10 is in alignment with the first through-hole 14 of the first retention element 8 and the recess 32 of the receiving member 34 which is secured to the vehicle so that the securing element 20 can be introduced, in particular screwed into the second through-hole 16, the recess 32 and the first through-hole 14. The securing element 20 is screwed in in such a manner that the retention member 4 is secured against undesirable pivoting out of the retention position and against removal of the retention member 4 out of the receiving member 34 which is secured to the vehicle.

LIST OF REFERENCE NUMERALS

2 Fastening arrangement
4 Retention member
6 Line
8 First retention element
10 Second retention element
12 Insertion element
14 First through-hole
16 Second through-hole
18 (Film) hinge
20 Securing element
22 Line guide
24 Pin
26 Recess
28 Through-opening
30 Suction installation for a motor of a motor vehicle
32 Recess
34 Receiving member secured to the vehicle
36 Positioning element
38 Positioning counter-elements
40 Inner side

The invention claimed is:

1. A retention member for receiving a line, comprising:
a first retention element and a second retention element;
a joint by which the first retention element and the second retention element are pivotably connected to each other such that the retention member is pivotable between a retention position, in which the first retention element and the second retention element are in abutment with each other, and an assembly position, in which the first retention element is spaced apart from the second retention element, wherein
the first retention element and the second retention element each comprise a line guide, which in the retention position together define a through-opening for the line,
the first retention element comprises an insertion element arrangeable in a receiving member which is separate from the retention member and secured to the vehicle, and which comprises a first through-hole, and
the second retention element comprises a second through-hole which is in alignment with the first through-hole in the retention position.

2. The retention member according to claim 1, wherein the retention member is constructed in one piece.

3. The retention member according to claim 1, wherein the joint is a hinge.

4. The retention member according to claim 3, wherein the hinge is a film hinge.

5. The retention member according to claim 1, wherein the retention member is a plastics material injection-molded component.

6. The retention member according to claim 1, wherein the first retention element or the second retention element comprises a pin and the second retention element or the first retention element comprises a recess which corresponds to the pin, and
the pin is arranged in the recess in the retention position of the retention member.

7. The retention member according to claim 6, wherein the pin and a wall which defines the recess are connected to each other in a positive-locking or non-positive-locking manner in the retention position.

8. The retention member according to claim 1, wherein each line guide has a semi-circular profile.

9. A fastening arrangement for fastening a line to a motor vehicle, comprising:
a receiving member which is secured to the vehicle;
a securing element; and
a retention member, the retention member comprising:
a first retention element and a second retention element;
a joint by which the first retention element and the second retention element are pivotably connected to each other such that the retention member is pivotable between a retention position, in which the first retention element and the second retention element are in abutment with each other, and an assembly position, in which the first retention element is spaced apart from the second retention element, wherein
the first retention element and the second retention element each comprise a line guide, which in the retention position together define a through-opening for the line, the first retention element comprises an insertion element which is arrangeable in a receiving member which is secured to the vehicle and which comprises a first through-hole, and the second retention element comprises a second through-hole which is in alignment with the first through-hole in the retention position, wherein the insertion element of the retention member is arranged in the receiving member which is secured to the vehicle, wherein the receiving member which is secured to the vehicle comprises a recess which is in alignment with the first through-hole and the second through-hole, and wherein the securing element is arranged in the first through-hole, the second through-hole and the recess such that the retention member is secured in the receiving member which is secured to the vehicle and in the retention position.

10. The fastening arrangement according to claim 9, wherein the securing element is a screw or a clip.

11. The fastening arrangement according to claim 9, wherein the recess of the receiving member which is secured to the vehicle is delimited at an upper end which faces into the through-opening.

12. The fastening arrangement according to claim 9, wherein the recess of the receiving member which is secured to the vehicle is U-shaped and is open at a lower end thereof facing away from the upper end, or the recess of the receiving member which is secured to the vehicle is round.

13. The fastening arrangement according to claim 9, wherein the receiving member which is secured to the vehicle comprises a positioning element and the retention member comprises a positioning counter-element which corresponds to the positioning element, the positioning element and the positioning counter-element are constructed such that a position of the retention member in the receiving member which is secured to the vehicle is unambiguously determined.

14. A method for fastening a line to a motor vehicle, comprising:

providing a retention member for receiving a line, the retention member comprising:

a first retention element and a second retention element;

a joint by which the first retention element and the second retention element are pivotably connected to each other such that the retention member is pivotable between a retention position, in which the first retention element and the second retention element are in abutment with each other, and an assembly position, in which the first retention element is spaced apart from the second retention element, wherein the first retention element and the second retention element each comprise a line guide, which in the retention position together define a through-opening for the line, the first retention element comprises an insertion element which is arrangeable in a receiving member which is secured to the vehicle and which comprises a first through-hole, and the second retention element comprises a second through-hole which is in alignment with the first through-hole in the retention position;

introducing the insertion element of the retention member into the receiving member which is secured to the vehicle;

arranging the line in the line guide of the first retention element;

pivoting the second retention element with respect to the first retention element in such a manner that the retention member is in the retention position;

introducing a securing element into the second through-hole of the second retention element, the recess of the receiving member which is secured to the vehicle, and the first through-hole of the first retention element.

15. The method according to claim 14, wherein the securing element is screwed into the second through-hole of the second retention element, the recess of the receiving member which is secured to the vehicle, and the first through-hole of the first retention element, or the securing element is clip-fitted in the second through-hole of the second retention element, the recess of the receiving member which is secured to the vehicle, and the first through-hole of the first retention element.

* * * * *